Jan. 20, 1970  KARL-HEINZ SCHNARR ET AL  3,490,722
EMERGENCY LANDING DEVICE FOR AIRPLANES
Filed Nov. 13, 1967  10 Sheets-Sheet 2

Inventors
Karl-Heinz Schnarr
Walter Kücken
By: Olson, Trexler, Wolters & Bushnell
attys.

Inventors
Karl-Heinz Schnarr
Walter Kücken
By: Olson, Trexler, Wolters & Bushnell attys

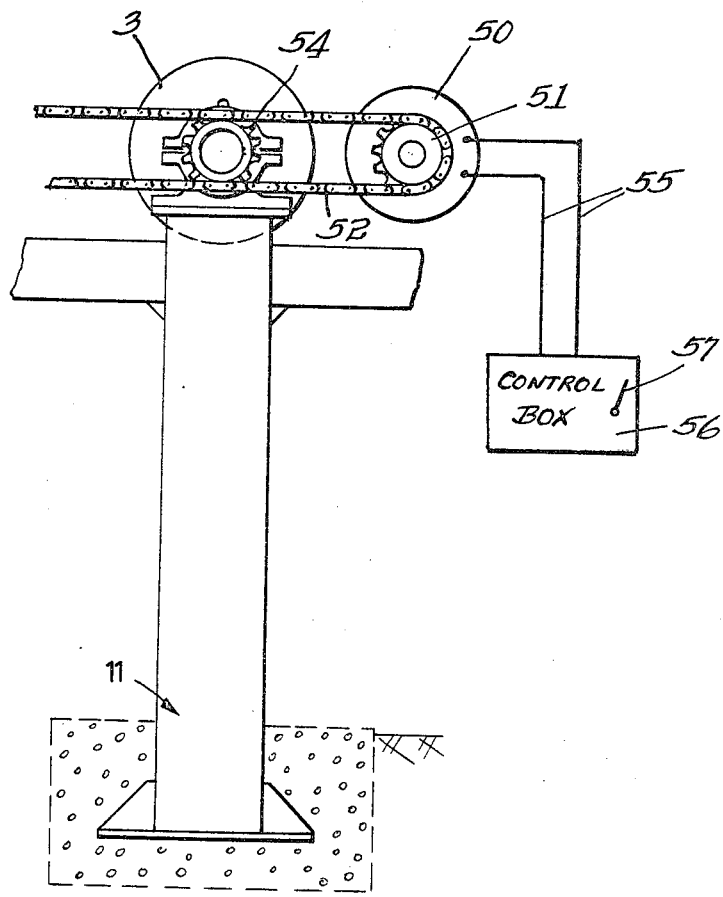
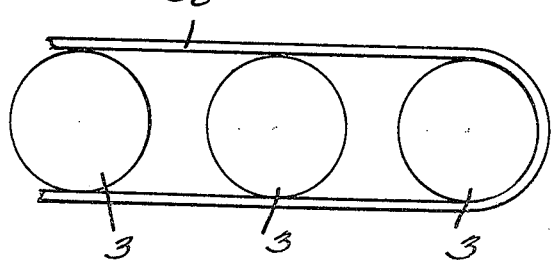
Fig. 5
Fig. 5a.

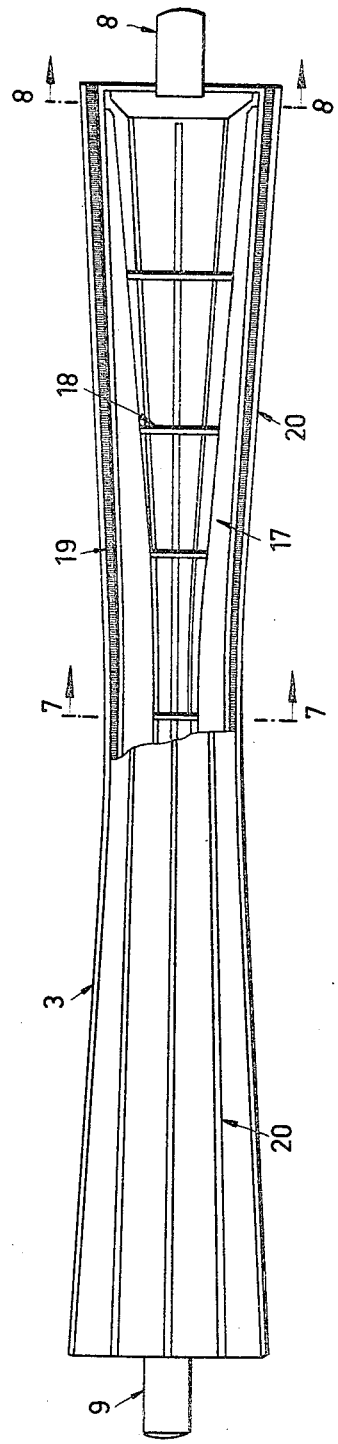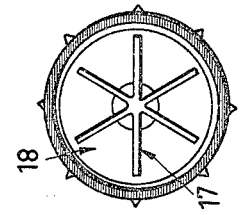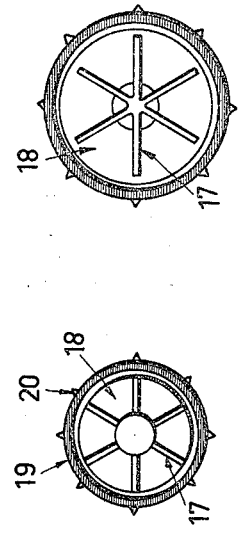

Inventors
Karl-Heinz Schnarr
Walter Kücken
By: Olson, Tredler, Wolters & Bushnell attys Inventors.
Karl-Heinz Schnarr
Walter Kücken
By: Olson, Trexler, Wolters & Bushnell attys.

United States Patent Office 3,490,722
Patented Jan. 20, 1970

3,490,722
EMERGENCY LANDING DEVICE FOR AIRPLANES
Karl-Heinz Schnarr, Hannoversche Strasse 82, Bremen-Hemelingen, Germany, and Walter Kucken Braahlandsweg 26, Bremen-Huchting, Germany
Filed Nov. 13, 1967, Ser. No. 682,158
Claims priority, application Germany, Aug. 9, 1967,
B 93,886
Int. Cl. B64f 1/22
U.S. Cl. 244—114                                          13 Claims

ABSTRACT OF THE DISCLOSURE

A succession of rollers mounted on an airfield or the like for the landing of an airplane with its wheels or landing gear in retracted position, accompanied by a pair of outrigger tracks having movable carts thereon for supporting the wings to prevent tipping of the airplane from side to side.

---

The present invention relates to an emergency landing device for airplanes which will substantially eliminate the dangers attendant upon emergency landings.

From time to time emergency landings must be made with the landing gear or undercarriage in retracted position. This is often known as a "belly landing." Such a landing causes considerable damage to the airplane, with attendant dangers for the passengers and crew. Not only is the underside of the fuselage of the airplane extensively damaged by sliding down a runway, but sparks are an almost inevitable accompaniment of such sliding. Since gasoline or jet fuel is likely to be released in such a landing, fire is an ever present danger. Not all of the fuel can be exhausted from an airplane before an emergency landing, as the landing might have to be aborted, and sufficient fuel must be left for the airplane again to reach a safe altitude and make another landing approach.

Attempts have been made to minimize the risks of emergency landings of this type by tensioning wire or nets across the runway transversely to the direction of landing, thereby to shorten the landing path, and hence the frictional heating and sparking. However, such wires or nets create a great shock impact upon the airplane which is likely to do extensive damage to the airplane, and to injure passengers. If the shock load is reduced, then the sliding or landing path has to be increased in length, with increase in frictional heat and sparking. Furthermore, in the case of a stretched wire or the like, it is necessary for each airplane to be equipped with a catching hook to engage the wire, and such hook may easily malfunction. All such prior art made for emergency landings have been compromise solutions which do not fully overcome the problems, but merely decrease the magnitude of the dangers involved.

Another known procedure for such emergency landings involves the application of a carpet of foam to the runway. Fire cannot be completely avoided in this manner, nor can damage of the airplane, although the fire damage is decreased. Such a foam carpet is expensive, and can be used only once. After use, it must be removed, such as by washing down the runway with fire hoses, before normal traffic can return to the runway. This causes the removal from traffic for a number of hours of a runway, resulting in stacking up of airplanes, and severe economic loss.

Past difficulties and risks can only increase in the future as airplanes become both faster and larger, and as the density of traffic increases.

The present invention is directed to the solution of previously unresolved problems in making emergency landings. Thus, it is an object of the present invention to provide a device or apparatus for landing an airplane with the landing gear retracted with practically no danger to the aircraft, and little chance for injury to the passengers or crew.

More particularly, it is an object of the present invention to provide as a ground installation a conveyor means on which an aircraft may land with its wheels up.

More specifically, it is an object of the present invention to provide a ground installation involving a series or track of rollers on which an airplane may land with its landing gear retracted, whereby to avoid damage to the airplane and injury to the passengers and crew.

An ancillary object of the present invention is to provide such a system with outrigger stabilizer means for engaging the wings of an airplane to prevent tipping and consequent damage.

In accordance with the present invention, the emergency landing device for airplanes includes a track or array of rollers arranged a slight distance above the ground on an airfield. The rollers are mounted for turning in a long frame or the like, and serve for supporting the airplane fuselage, the axes of rotation being parallel to one another and transverse to the direction of landing. To either side of this array or track of rollers is provided a track having a cart or bracket for receiving the wings, and traveling with the landing airplane to prevent tipping thereof.

Thus, the greatest source of danger is eliminated, namely sliding friction, so that in an emergency landing with the landing gear retracted, there will only be the rather minimal rolling friction, rather than sliding friction, offering no substantial danger. Little or no advance preparation for such a landing need be made, and the ordinary runways may remain in normal operation. Time is not lost on the part of the emergency landing airplane, since it need not fly around in circles for many hours to burn up excess fuel. Likewise, time is not lost for other airplanes that must circle and stand by during the landing and subsequent cleanup operation. The risk of fire is substantially totally overcome, and damage to the airplane is greatly reduced.

In the preferred embodiment of the invention the rollers taper in diameter from the ends toward the center, thereby guiding the airplane along the train of rollers. Furthermore, it is contemplated that shock absorbers might be used in mounting the rollers in a resilient manner In a further preferred embodiment of the invention, the rollers are jacketed or coated with a non-combustible plastic or elastomeric material providing additional resiliency, and additionally having fins or ribs formed thereon which run more or less axially and extending radially out from the jacket. The rollers preferably are water-cooled by being partially immersed in a water filled container, whereby their surfaces are cooled by turning through the water. Additionally, water is thrown up by the ribs or fins to hit the fuselage of the airplane, thus cooling the airplane and further reducing fire hazards.

Advantageously, the rollers—at least in the beginning of the train of rollers—may be driven by a motor or series of motors so that the peripheral speed of the rollers can be adapted to the landing speed of an airplane making an emergency landing. Thus, the airplane may be brought to a halt in a more restrained manner. The rollers are braked in part by moving through the water bath, and particularly with the fins thereon. This can be augmented by additional mechanical brakes, or by using the motors as electromagnetic brakes.

In order to prevent the airplane from tilting or falling over laterally away from the train of rollers, means is provided at either side thereof to engage the airplane wings. Such wing engaging structure may include conveyor belts, and, in the illustrated exaample of the invention, comprise a pair of carts moving in tracks parallel to the train of rollers.

Each such cart is adjustable as to height to accommodate to different types of airplanes. Shock absorbers are provided in such carts. Each cart at its upper end is provided with a supporting arm which normally tilts down to the rear, and which has at its upper, forward end an abutment engageable by the leading end of the wing, whereby to tip the arm up under the wing upon engagement of the abutment.

Reference should now be had to the drawings wherein:

FIG. 5 is a section along line 5—5 of FIG. 4;

FIG. 5A is a detail showing a modification of FIG. 5;

FIG. 6 is a roller, partially as a section;

FIG. 7 shows a section along line 7—7 of FIG. 6;

FIG. 8 is a section along line 8—8 of FIG. 6;

Figure 1:
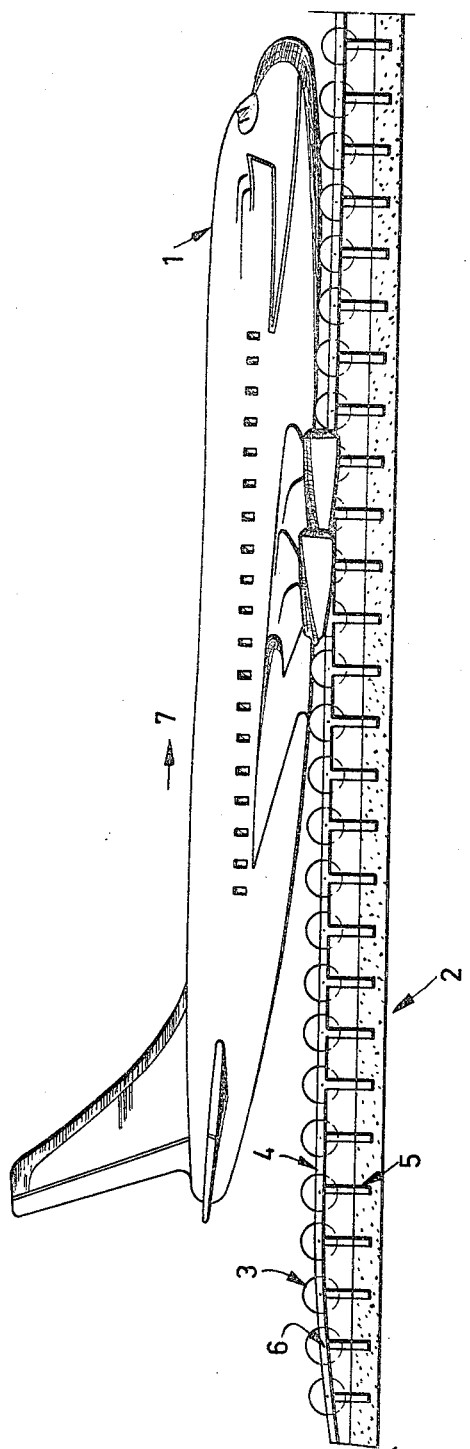
FIGURE 1 is a lateral view of an airplane, which has made an emergency landing, as it rests upon the train of rollers, the wing supporting brackets being omitted.
Figure 2:
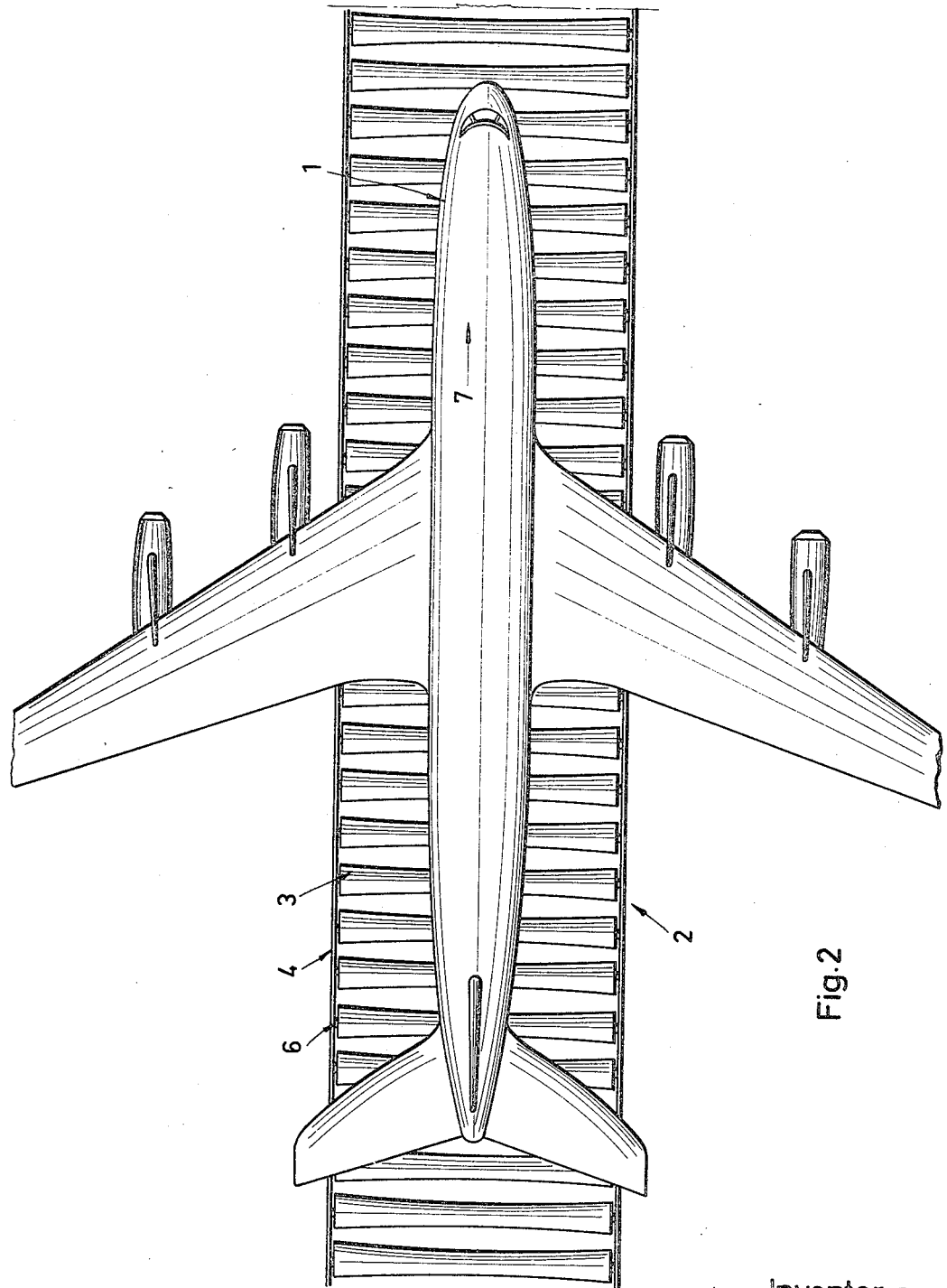
FIG. 2 is a plan of the airplane according to FIG. 1.
Figure 3:
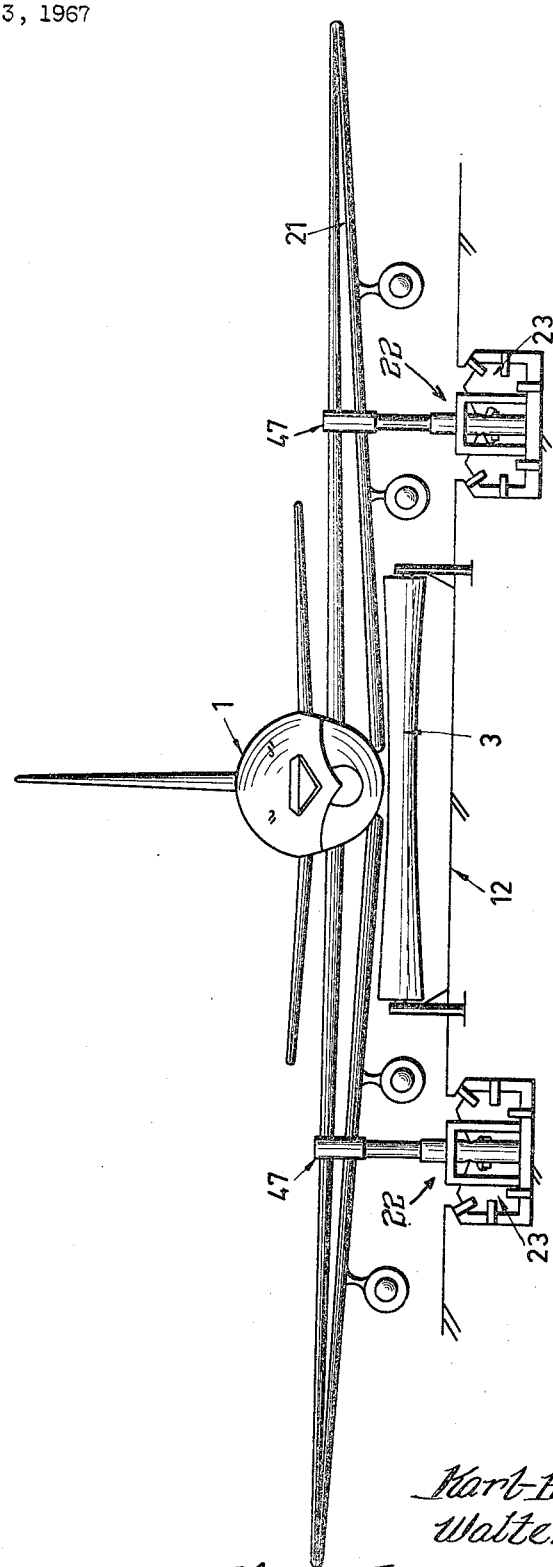
FIG. 3 is a front view of an airplane resting upon the train of rollers and laterally supported by two brackets.

In FIG. 1 is shown the airplane 1 having a defective and retracted undercarriage, and which has therefore just landed upon the emergency landing device 2 which is constructed according to the invention.

This device consists of a plurality of rollers 3 which are supported in a way that they can turn in a common frame 4, 5, such that their axes of rotation 6 (axles) are transverse to the direction of landing 7 of the airplane 1.

Figure 4:
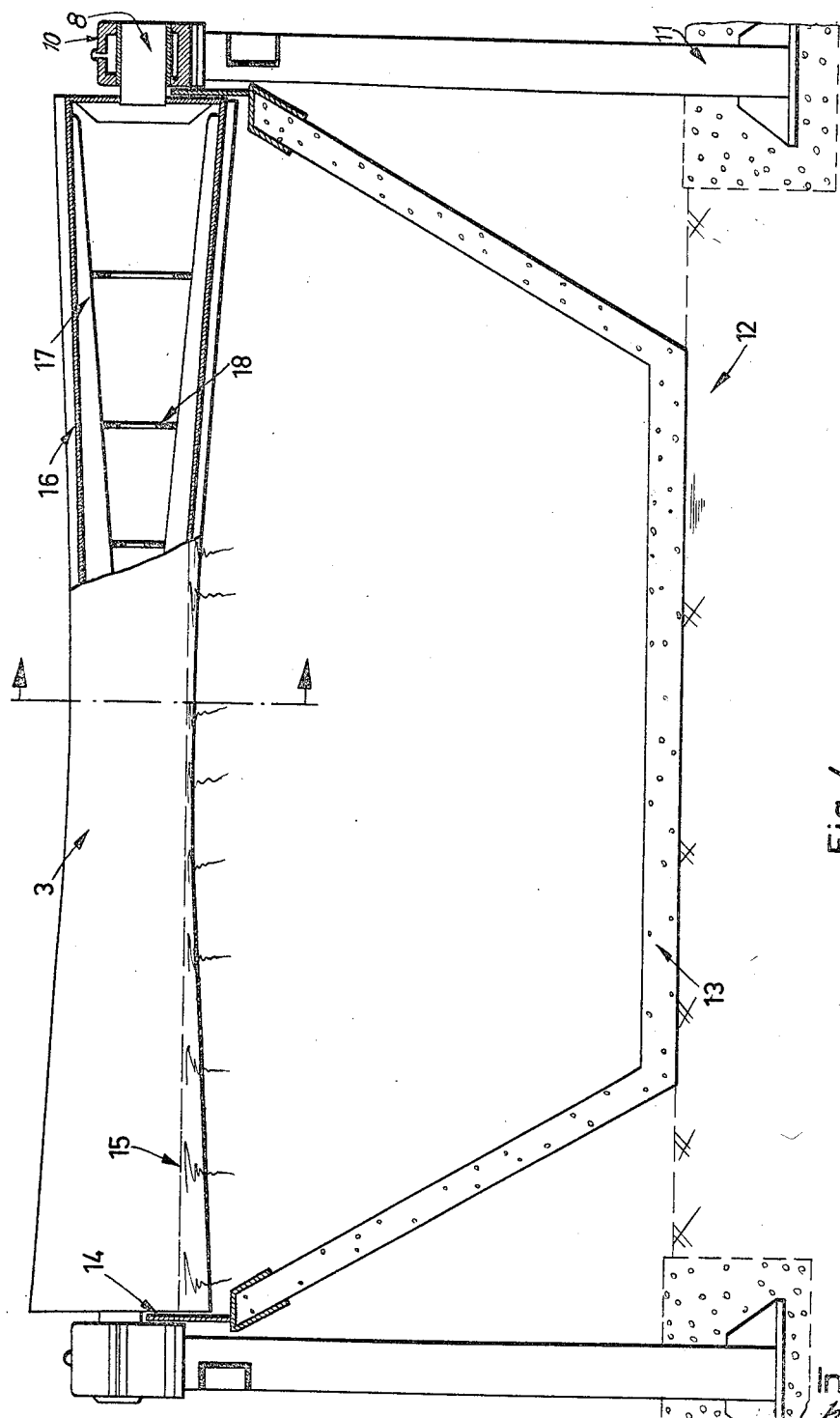
FIG. 4 shows on an enlarged scale a partial cross section through the train of rollers.
Figure 9:
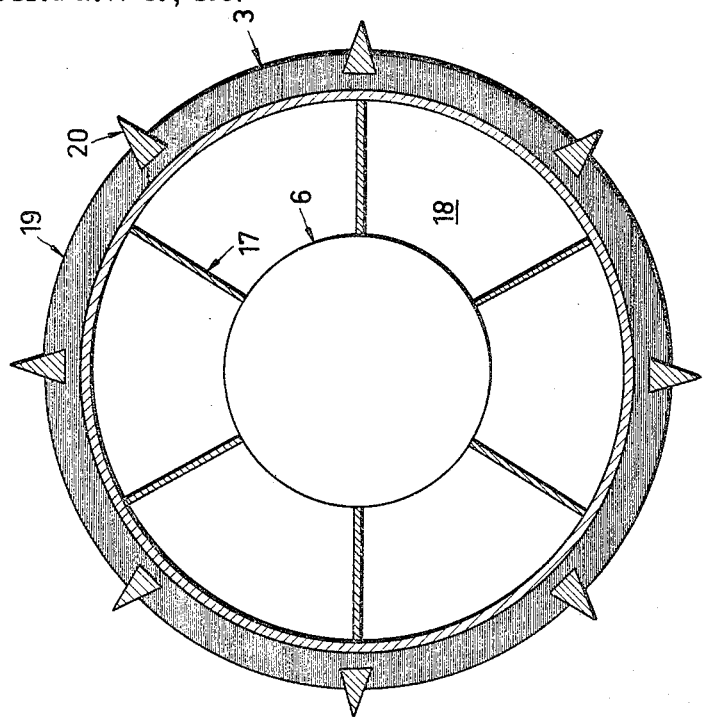
FIG. 9 shows on an enlarged scale a cross section through a jacketed roller.
Figure 10:
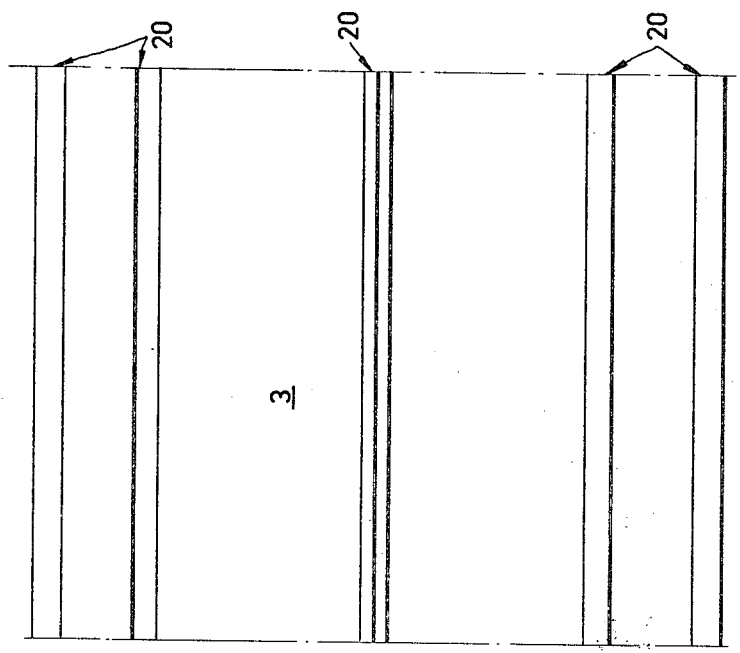
FIG. 10 is a partial view of a roller according to FIG. 9.

As one recognizes from FIG. 4, the rollers 3 at their opposite ends are equipped with trunnions 8, 9 which may turn inside bearings 10. These bearings 10 themselves are attached upon vertical supports 5 which are formed from U irons, the lower ends 11 of which are rigidly anchored into the ground 12. In order to form the frame, all the supports 5 are connected with horizontally running diagonal trussings 4.

Underneath all the rollers 3, or only a portion thereof, a container 13 is provided, the upper end 14 of which is located closely adjacent to the trunnions 8, 9 directly beneath them. The container serves for the accommodation of water, the level 15 of which is so high that the roller 3, along its full longitudinal extension, protrudes into the water. As soon as the rollers start to turn (either because an airplane landed upon them, or under the action of a special drive supsequently described in connection with FIG. 5), their jacket surfaces are cooled continuously with water. Thus, not only the roller itself is cooled, but the airplane fuselage is also cooled by the water layer which is entrained from the jacket.

As one recognizes from FIGS. 2, 4, 6, 7, and 8, the roller 3 may be tapered off in its cross section toward its center, which facilitates the guiding of the airplane which rolls along the device; the airplane being kept in the center of the train of rollers. In order to accommodate the great shock exerted by an airplane which comes down, such a roller 3 first of all is equipped with a metal jacket 16 which on its inside is strengthened by longitudinal girders 17 and by cross bracings 18. In order to reduce the moment of inertia, which influences the forces of sliding friction that arise during landing, the metal parts of the roller may be manufactured of a light metal of high strength. The jacket 16 of the rollers 3, as recognizable from FIGS. 6 through 10, is equipped with a special jacket of rubber, polymer, or a similar material. This jacket serves first of all to avoid the spark formation which could never be depressed completely in any prior art device. Furthermore, it shows a certain flexibility, so that the forces acting on the fuselage are distributed better. Preferably, the jacket is made from a polymer which is low in friction, like polytetrafluoroethylene, and in this way the residual frictional forces are cut down still more.

Ribs or fins 20 are provided on the jacket 19 running in the direction of the axis of rotation 6 of the rollers 3. These ribs 20 have a triangular cross section, and extend from the circumferential surface of the rollers. The ribs 20 increase the braking action which the water exerts upon the roller, and hurl the water from the container 13 upwardly against the fuselage of the airplane so as to increase the cooling action. Furthermore, the roller is additionally cooled because its circumferential surface is enlarged by these ribs or fins.

In order to reduce still more the friction between fuselage and rollers, the rollers preferably are driven by aid of one or several motors, preferably electromotors. Likewise, it is preferred to provide a device for the braking of the rollers, so that the path, along which the airplane rolls, does not become too great. The driving and the braking preferably occurs under the action of the one or the same several electromotors, so that the circumferential speed of the rollers at first is adapted to the speed with which the airplane hits the ground. Thereafter the frequency of the operation current is reduced, the motor(s) is (are) disconnected from the city mains, and resistors are connected in series, so that slowly but surely an ever increasing braking action occurs. For controlling the act of braking, a circuit may serve which acts as a function of the weight of the airplane and of its velocity at any moment, and also as a function of the friction coefficient between the jacket 19 and the fuselage, thus determining the braking force required. There might be connected to each roller 3 its individual motor, or several groups of rollers or all the rollers together may be driven by one common motor, such as by use of a chain drive.

Thus, as is shown in FIG. 5, an electric motor 50 is provided with an output shaft having a gear 51 thereon driving a chain 52. This chain drives gears 54 respectively fixed on the axle shafts of the rollers 3 for turning the rollers. As will be understood, one motor can drive a large number, perhaps all, of the rollers, or there may be one motor provided for each roller. The motor, or all of the motors if there is more than one, are electrically connected at 55 to a control box 56, which may be automated, and which may also include a control handle 57. The control box is suitably supplied with electricity of a commercial nature, and the handle 57 may be operated to bring the motor up to speed, or, as indicated, this may be effected automatically from a radar control or the like. Once the airplane has landed on the rollers, the handle 57 moved, or automatic controls take effect to remove the electric input from the motor, and to place a controlled resistance or short circuit across the motor, whereby the motor acts as a dynamic brake. The degree of braking can be controlled by varying the amount of resistance placed across the motor.

A modification of the invention is illustrated in FIG. 5A wherein a conveyor belt 58 is shown as passed over the rollers 3. The conveyor belt provides a more continuous surface for engagement of the airplane, with less danger of damage from the succession of rollers. As will be apparent, only one roller need be driven in this modification, since the belt will bring the other rollers up to speed, and also control braking thereof.

Figure 11:
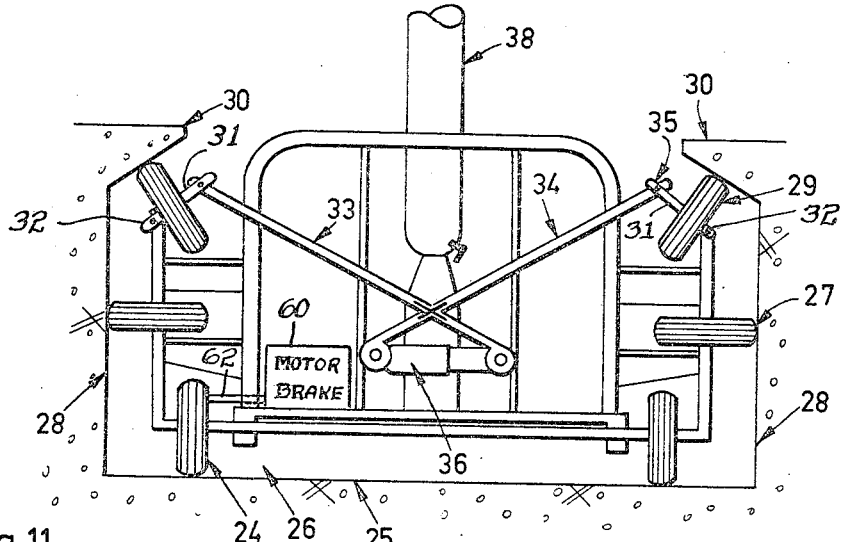
FIG. 11 is a front view of a cart forming a wing supporting bracket.
Figure 13:
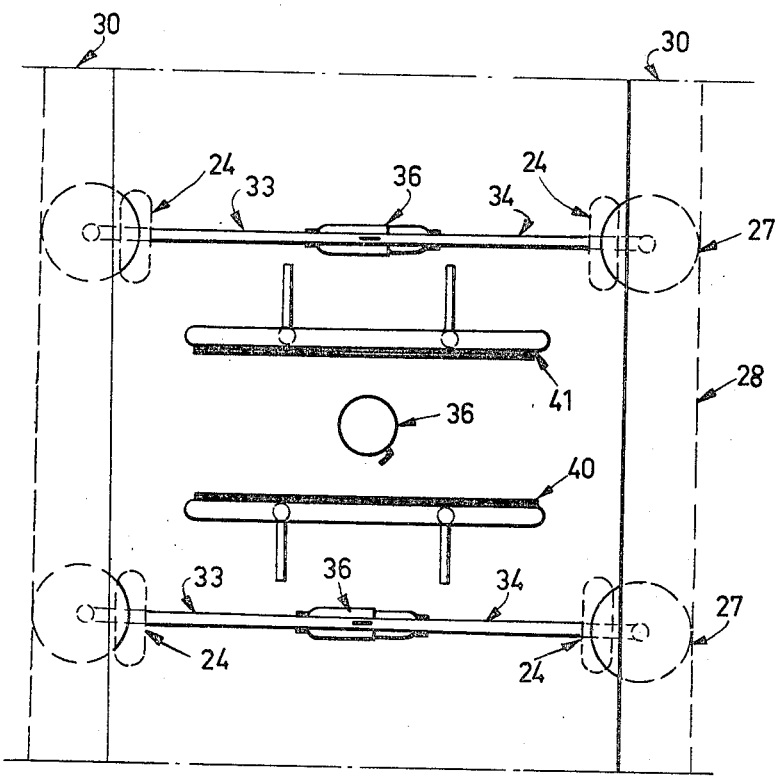
FIG. 13 is a plan view of the cart according to FIG. 12.
Figure 12:
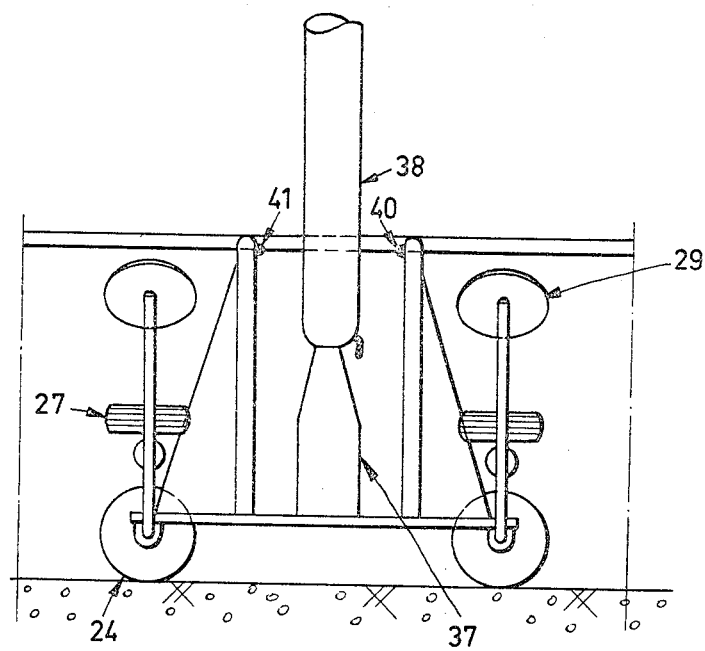
FIG. 12 is a lateral view of the cart according to FIG. 11.
Figure 15:
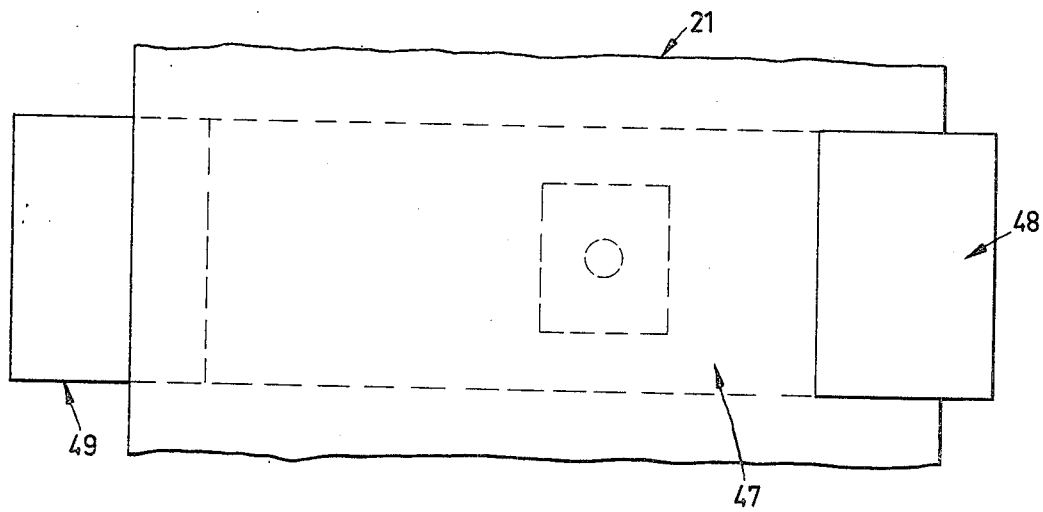
FIG. 15 is a plan of the supporting arm.
Figure 14:
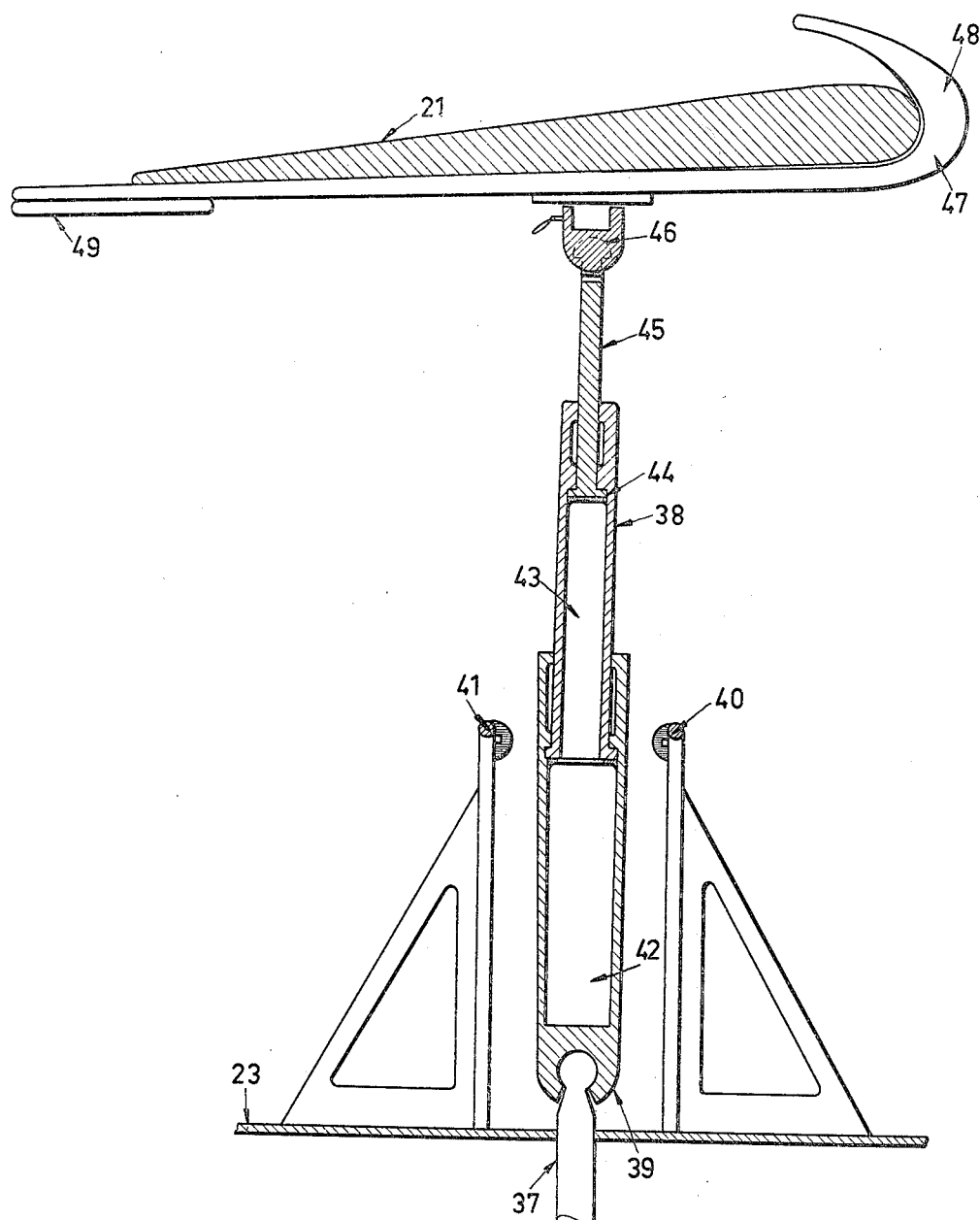
FIG. 14 shows on an enlarged scale a section through the truss and the supporting arm of a bracket.

For the guiding of the lifting surfaces or wings 21 of the airplane 1 during the landing in the typical example of the invention shown, brackets 22 are provided, respectively located at both sides of the train of rollers 3, which brackets follow the motion in the direction of landing 7; such a bracket is made up of a cart 23. This cart has four supporting wheels 24 which run upon the underlying horizontal surface 25 of a track 26 with a U profile. One of these tracks 26 is on each side of the train of rollers, extending along the full length of the train. For the lateral guiding of the cart 23 in the rail 26 four supporting wheels 27 are used which keep the cart in contact with the lateral walls 28 of the track 26. Preferably, at least one of the wheels 24 is controlled by a motor-brake unit 60 (FIG. 11), for example by a shaft 62 having a spur gear (not shown) on the end thereof engaging an internal ring gear (not shown) on the wheel. Control is from the control box 56 as by sliding contacts (not shown), or radio waves. In order to prevent the cart 23 from jumping out of the track 26, there are provided four more wheels 29 which make contact with two protrusions or flanges 30 that are directed toward one another. The wheels 29 run upon shafts 31, the one end of which is tiltable together with the wheel, with the interposition of a hinge 32, around an axis which lies in the direction of airplane motion. The two ends of the shafts 31 of wheels 29, which in the direction of airplane motion face each other, are connected to each other by aid of a compensating rod system such that the cart, even if slightly tilted, will, with its wheels 29, continuously be kept in contact with the flange 30. This system of transmission rods consists of a number of parts; there are, e.g., the two rods 33, 34 which, with the interposition of one hinge 35 each, are attached to the free ends of the shafts 31. The rods 33, 34 cross over each other in the center plane of the cart 23, whereafter each one reaches one end of a strong compression spring 36. In the longitudinal vertical plane of the cart there preferably is provided a trunnion, across which the rods 33 are guided in oblong holes. Instead of this guiding inside the trunnion, there exists also the possibility to attach the compression spring 36 at the cart 23 so that it might be shifted in the longitudinal direction.

Approximately in the center plane of the cart 23 a bowl gudgeon (ball and socket) 37 is attached which serves to accommodate a vertical support 38 which itself is equipped with a ball cup 39. Furthermore, at the cart 23 are arranged two abutments 40, 41 which allow a slight tilting of the support 38 inside the bearing 37, 39 in the direction of airplane motion. The support 38 itself consists of a hydraulic piston cylinder arrangement and is set up such that it might be adjusted with respect to height by the introduction of a pressure agent into the cylinder spaces 42, 43. The upper end of the cylinder 43 is limited by a piston 44 from which a piston rod 45 extends freely upward. The piston cylinder arrangement by aid of valves (not shown) is constructed as a shock absorber, so that a pressure exerted upon piston rod 45 becomes decreased by the blow-off of the corresponding valves.

At the free end of the piston rod 45 of the support 38 a hinge 46 is provided which carries a supporting arm 47. The hinge 46 is first of all tiltable in a plane which lies in the direction of motion of the cart, and supports the supporting arm 47 in the direction of motion ahead of the center of gravity thereof, so that this supporting arm in its position of rest will hang so that it rises in the direction of motion. At the front end of this bearing arm 47, an abutment 48 is located, against which the lifting surface or wing 21 of the airplane will make contact and tilt the supporting arm 47 more or less into its horizontal position. In order to guarantee for sure the hanging down of the supporting arm before the wing sets down or makes contact, the supporting arm 47 at its rear end carries, in addition, a counterweight 49. With this construction, the pilot does not have to pay too much attention to the position of the wings, because they will surely hit the supporting arm 47 in its inclined, hanging position, and thus will pull the arm and the corresponding wing into the correct position.

In order to bring about that the emergency landing device with the brackets 22, which are guided in tracks, cannot only be adapted to lifting surfaces which lie in different heights but can take care also of the difference in positions of the engine propeller units, the support 38 is tiltable by a rather large angle between the abutments 40 and 41, i.e., transversely to the direction of airplane motion, and then the bearing 46 in correspondence to this is constructed such that it can adjust to this tilting motion and compensate for it, so that the transverse axis of the supporting arm 47, irrespective of the position of the support 38, always will run in the horizontal direction.

Instead of the two carts 23, the brackets 22 may be formed also from two belts which—supported in certain distances by special rollers—extend along both sides of the train formed by the rollers 3 and are set up similar to a conveyer belt. In order to reduce the frictional forces arising when the lifting surfaces come down upon the belts, the belts preferably are driven first at the landing speed of the airplane, and thereafter, synchronously to the braking of the rollers 3, are slowly decelerated. Such a synchronous deceleration may be provided without difficulty also at the carts 23.

There also exists the possibility to equip the rollers 3 with a common belt which, in the manner just explained, as a function of the speed of the roller 3, is accelerated first to the speed of landing of the airplane, and thereafter slowly is decelerated. A cooling device at such an embodiment of the invention ought hardly to be required, but there exists the possibility to shape the surface of the belt in a honeycomb manner and to pass it at the backward motion underneath the rollers supporting it through a water container, so that such a belt will entrain water on its surface.

The container 13, instead of being filled with water, may be filled also with a fire extinguishing agent, and thus might serve other purposes, not only simply for cooling. As such fire-extinguishing agents, one may employ almost all the known media used for such purpose.

This landing device according to the invention, just as any ordinary landing strip, is equipped with landing aids, like the commonly used flare path lighting (beacon lights), but then also there should be placed the radio range beacons which one requires for a blind landing, and similar equipments.

The invention is claimed as follows:

1. An emergency landing device for airplanes comprising first and second traveling supporting means, said first supporting means comprising a long frame extending in the direction of landing, a plurality of individual rollers rotatably mounted on said frame for supporting an airplane fuselage, the axis of rotation of said rollers being parallel to one another and transverse to the direction of landing, and a water tank underlying said rollers and positioned so that said rollers will dip at least part way into water when said water tank is filled, and said second supporting means including means spaced laterally from said first supporting means and engagable with a wing of said airplane to prevent tipping thereof, and said second supporting means being moveable with said airplane in the direction of landing.

2. An emergency landing device as defined in claim 1 and further including a plurality of ribs on the surface of each of said rollers, said ribs extending generally longitudinally of each roller and being shaped to lift water from said water tank when the rollers are rotated to aid in cooling said rollers.

3. An emergency landing device as set forth in claim 1 wherein at least a part of one of the supporting means runs uphill.

4. An emergency landing device as set forth in claim 1 wherein said rollers each have a diameter decreasing in axial direction from the ends thereof toward the center.

5. An emergency landing device as set forth in claim 1 and further including means for driving at least one of said supporting means in the direction of airplane landing before engagement thereof by an airplane.

6. A device as set forth in claim 1 and further including means for braking at least one of said supporting means after engagement thereof by an airplane.

7. An emergency landing device as set forth in claim 6 and further including means for driving at least one of said supporting means in the direction of airplane landing before engagement thereof by an airplane.

8. An emergency landing device as set forth in claim 1 wherein at least one of said supporting means includes a shock absorber.

9. An emergency landing device as set forth in claim 1 wherein at least the surface of each roller is resilient.

10. An emergency landing device as set forth in claim 9 wherein said resilient surface comprises a plastic material having a low coefficient of friction.

11. An emergency landing device for airplanes comprising first and second traveling supporting means, said first supporting means including first conveyor means for receiving and supporting the fuselage of an airplane and being moveable in the direction of landing with said airplane, and said second supporting means including two parallel tracks positioned on opposite sides of said first conveyor means, each of said tracks having inwardly directed flanges running along the upper edges thereof, and a pair of moveable carts each mounted on a corresponding one of said tracks for movement therealong, said moveable carts being dimensioned to engage a corresponding wing of said airplane to prevent tipping thereof.

12. An emergency landing device as set forth in claim 11 wherein each cart has bearing wheels engaging the lower surface of the respective channel, and further having positioning wheels engageable with lateral portions of said channel for centering the cart.

13. An emergency landing device as set forth in claim 1, wherein said second supporting means is adjustable in position for adapting to wings of different types of airplanes.

References Cited

UNITED STATES PATENTS

| 2,425,886 | 8/1947 | Knox | 244—110 |
| 2,592,581 | 4/1952 | Lorig. | |
| 2,783,005 | 2/1957 | Kane | 244—63 |
| 2,886,156 | 5/1959 | Halbron | 193—37 |
| 3,143,322 | 8/1964 | Mainwaring | 244—114 |
| 3,210,029 | 10/1965 | Brusch et al. | 244—114 |
| 3,400,988 | 9/1968 | Hudson et al. | 193—37 XR |

FOREIGN PATENTS

| 704,187 | 2/1965 | Canada. |
| 999,871 | 10/1951 | France. |
| 1,263,980 | 5/1961 | France. |
| 1,347,754 | 11/1963 | France. |
| 41,452 | 4/1957 | Poland. |

MILTON BUCHLER, Primary Examiner

PAUL E. SAUBERER, Assistant Examiner

U.S. Cl. X.R.

244—110